Jan. 23, 1940.                    H. A. WOOD                    2,187,960
         DEAD LINE FASTENER AND CLAMP FOR DERRICK LINES AND THE LIKE
                     Filed Jan. 29, 1937            2 Sheets-Sheet 1
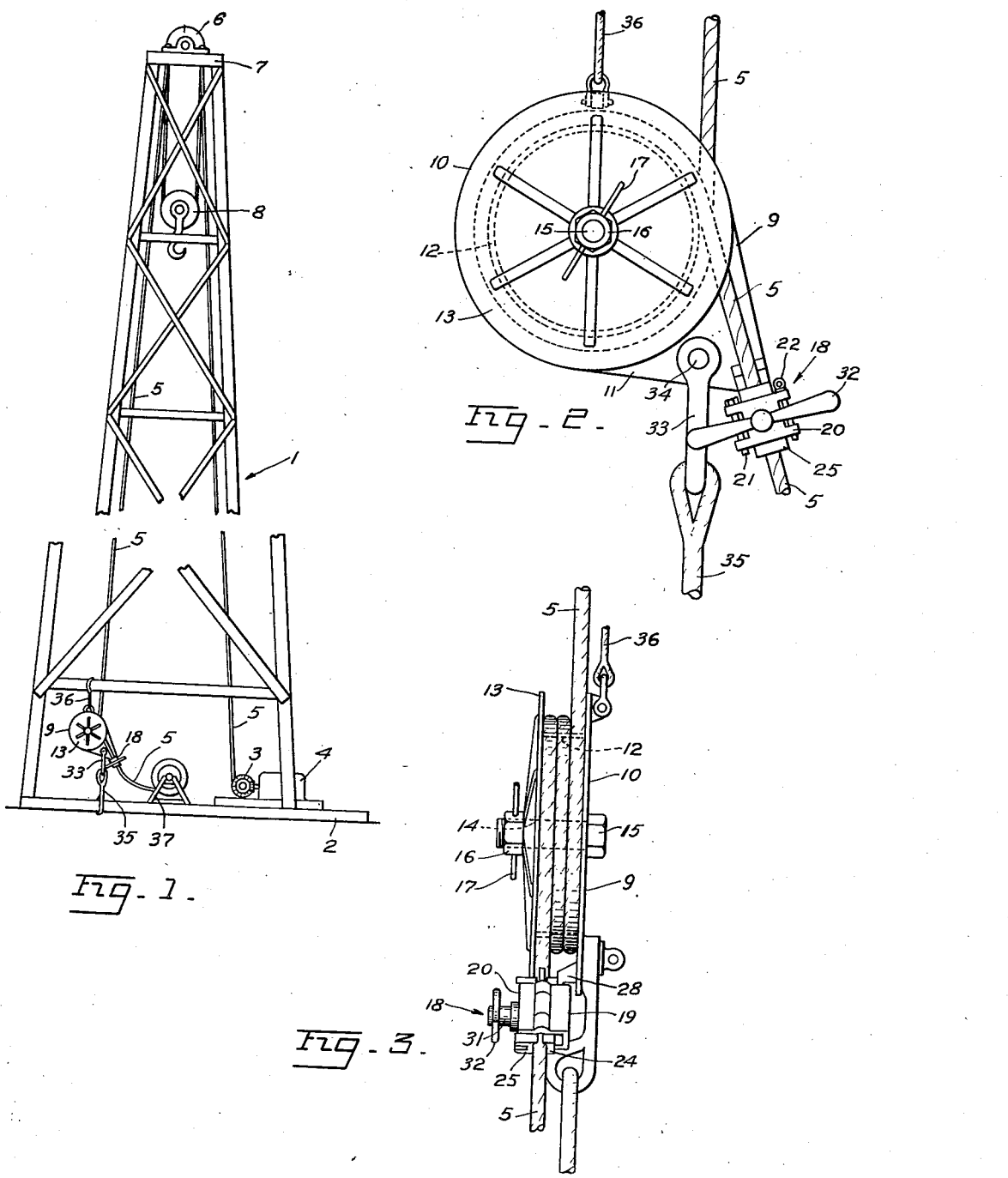
INVENTOR.
HENRY ALLYN WOOD
BY Nunn, Anderson & Liddy
ATTORNEY.

Jan. 23, 1940.  H. A. WOOD  2,187,960
DEAD LINE FASTENER AND CLAMP FOR DERRICK LINES AND THE LIKE
Filed Jan. 29, 1937   2 Sheets-Sheet 2

INVENTOR.
HENRY ALLYN WOOD
BY Munn, Anderson + Liddy
ATTORNEY.

Patented Jan. 23, 1940

2,187,960

UNITED STATES PATENT OFFICE 2,187,960

DEAD LINE FASTENER AND CLAMP FOR DERRICK LINES AND THE LIKE

Henry Allyn Wood, Berkeley, Calif.

Application January 29, 1937, Serial No. 122,968

4 Claims. (Cl. 24—115)

My invention relates to improvements in dead line fastener and clamp for derrick lines and the like, and it consists of the combinations, constructions and arrangements hereinafter described and claimed.

In the drilling of oil, gas or water wells, by the "rotary" method, it is customary to handle the drill pipe or casing in or out of the hole by means of an engine and drum on which is wound a wire rope that is reeved over a set of sheaves at the top of the derrick and down through a "traveling" or fall block. The block in turn is hooked or otherwise attached to the drill pipe or casing. The reeving is done in such a way that the traveling block is supported by a number of "line parts" anywhere from two to twelve. From the last reeving, the line is carried up over the crown block and thence down to the base of the derrick where it is "dead ended" or made fast by means of a hitch or a knot around the sill of the derrick. In order to further secure the line against slipping, the portion of the line just beyond the knot is clipped by wire rope clips to the portion of the line extending down to the sill. Any spare line is either left on the ground or coiled and hung on the derrick.

The portion of the line that receives the greatest wear is that which travels over the first sheave above the drum and the first sheave in the traveling block, since these sheaves travel at the greatest speeds. When this line portion wears out, it necessitates the discarding of the entire line. It is a well known principle in operating wire rope, however, that if the position of the line is changed periodically in its relation to the drum, sheaves, and load points, the life of the line will be greatly increased. The usual practice is to move sufficient line from the "dead end" through the blocks to the drum end, and to then cut off the old line and spool the fresh line on the drum. This operation changes the load points with the resultant increase in service. In changing to a fresh line portion, it is necessary to free the clips and to untie the knot from the sill. The clips frequently damage the line and the knot forms kinks in it making it difficult for the men to handle. The spare line is not cared for and is hard to uncoil. For these reasons, the line is usually discarded when five or six hundred feet have become worn and the balance of one thousand feet have become slightly worn.

The principal object of the present invention is to provide means for fastening the dead end of the line so that the line will not be damaged, and to provide means for storing the extra line while not in use, so this excess line will not be injured and still readily accessible. The fastening of the dead end will provide the full safety factor of strength necessary in work of this type and the fastening means is so designed that it may be quickly released to accommodate the moving of the line through the sheaves to the drum end.

Although the invention lends itself to rotary drilling rigs of the type known as "bob tailed", I do not wish to be confined to such a showing because it may be used on similar installations of drum, travel block, and dead end where wire rope is used. The use of my invention in such installations will result in a great saving in wire rope costs where the known principles of "moving the line" are used.

With my invention, I can "dead end" a line at a point not at the end of the line, and can secure the line so that strength and safety will be maintained without injury to the line. The "dead end" fastener may be quickly released from the line not now possible with the wire rope clipping method now used. The storage reel is ready to feed out all or a part of the line desired. This reel may be turned by hand, by crank, or by power. In some cases the storage reel may not be necessary while the clamp is used. For example, in gasoline or steam shovels the clamp alone might be used and the extra line would remain on a wooden spool attached to the side of the shovel or rig.

Other objects and advantages will appear in the following specification, and the novel features of the device will be particularly pointed out in the appended claims.

My invention is illustrated in the accompanying drawings forming a part of this application, in which Figure 1 is a front elevation of an oil derrick showing my device operatively applied thereto;

Figure 2 is a front elevation of a "dead line" fastener used in the device;

Figure 3 is a side elevation of Figure 2;

Figure 7:
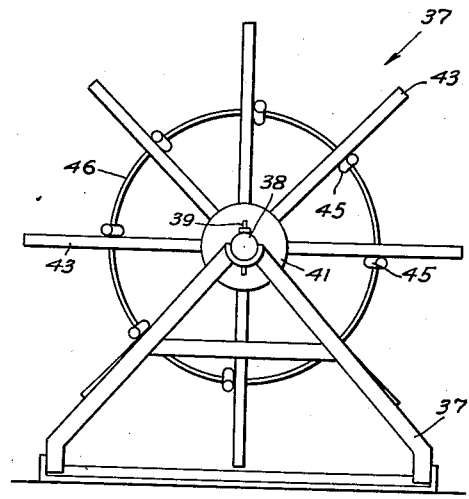
Figure 7 is a side elevation of a storage reel.
Figure 8:
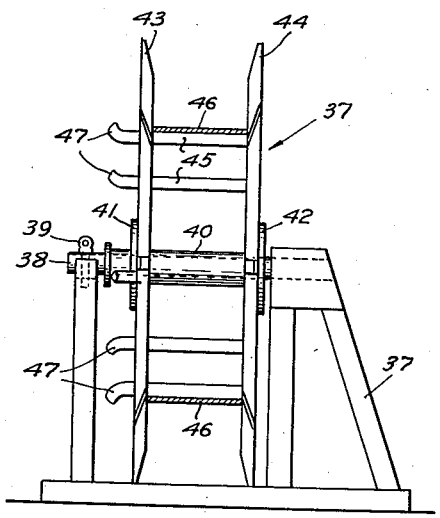
Figure 8 is an end view of Figure 7.

In carrying out my invention I provide a "dead line" fastener and clamp shown in Figures 2 to 6 inclusive and also provide a storage reel shown in Figures 7 and 8. These two devices are designed to be used in dead ending a line at any desired point intermediate the ends of the line and for storing the unused portion of the line. The dead ending of the line makes use of a clamp which holds the line against movement at the point of clamping and yet permits the line to be readily freed from the clamp when it is desired to unwind a portion of the stored line from the reel. I have shown the "dead line" fastener and clamp and the storage reel in connection with a rotary drilling rig, although I do not wish to be confined to such a showing. The oil rig shown in Figure 1 of the drawing merely gives one example of the use to which my invention may be put.

In Figure 1 I show a standard oil derrick indicated generally at 1. This derrick has a base 2 on which a drum 3 is mounted and this drum is actuated by an engine 4, or other suitable power source. A line 5 is wrapped around the drum and is then reeved over a sheave 6 in a crown block disposed at the top 7 of the derrick. The line 5 is then extended around a "travelling" or fall block indicated generally at 8. In standard practice, the line is passed around several sheaves in the crown block and in the fall block, the line parts ranging from two to twelve. The line 5 is then extended down toward the base 2 of the derrick and is secured to a "dead line" fastener and clamp shown in Figures 2 to 6 inclusive. I will now describe this part of my invention.

Dead line fastener and clamp

The "dead line" fastener and clamp comprises a back plate 9 that has a circular portion 10 merging into a triangularly-shaped portion 11. A circular flange 12 of less diameter than the circular portion 10, constitutes a snubbing member and is formed integral with the back 9 and projects forwardly from the front face of the back.

A retaining disc 13 has a central opening 14 for receiving a bolt 15 carried by the back plate 9. A nut 16 is threaded on the bolt and is provided with handles 17 for permitting it to be turned on the bolt.

The line 5 has a few turns wrapped around the circular flange 12 as shown in Figure 3 and then the disc 13 is placed over the flange and is secured in place by means of the bolt 15 and the nut 16.

Figure 4:
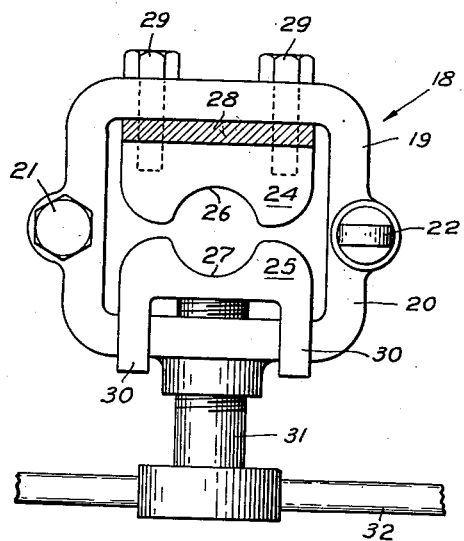
Figure 4 is a top plan view of a line clamp used in connection with the "dead line" fastener.
Figure 5:
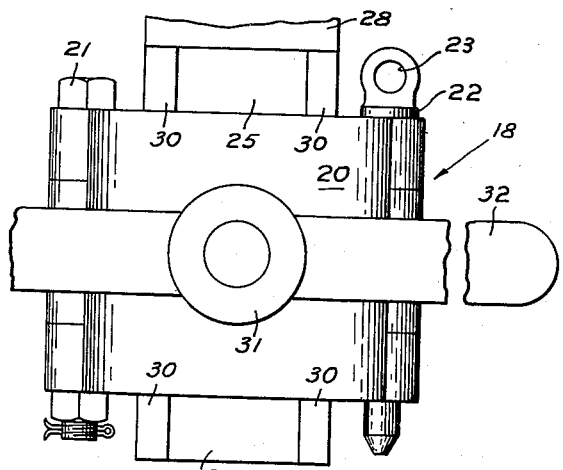
Figure 5 is a side elevation of Figure 4.

The triangular portion 11 carries a clamp indicated generally at 18, and this clamp is designed to grip the line 5. In Figure 4 I show the clamp as being provided with two separable halves 19 and 20. These are permanently pivoted together by a bolt 21 and their free ends are removably secured together by a pin 22. Figure 5 shows the pin 22 provided with an eyelet 23 to which a chain (not shown) may be attached for the ready removing of the pin. A pair of replaceable jaws 24 and 25 constituting clamping means to grip the dead end are mounted in the resulting clamping housing, and have complimentary grooves 26 and 27 for receiving the line 5. Said clamp housing is so carried by the backing member 9 as to locate the clamping means 24, 25 on a tangent to the periphery of the snubbing member 12, the importance of this relationship consisting of the ability to lay in the dead end portion of the line perfectly straight. The jaw 24 is placed in the clamp housing part 19 and rests against an arm 28 that is permanently secured to the back plate 9. Figures 3 and 4 show the arm 28 extending between the housing 19 and the jaw 24. Screws 29 are used for securing the jaw 24, arm 28 and housing part 19 together.

Figure 6:
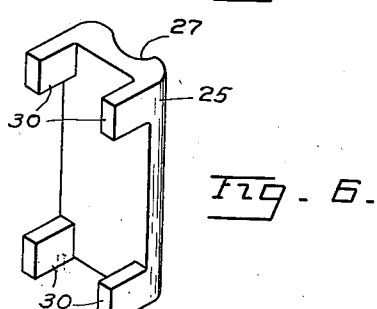
Figure 6 is a perspective view of one of the clamping members.

The jaw 25 is shown in perspective in Figure 6. This jaw has legs 30 that straddle the sides of the clamp housing part 20. An adjusting screw 31 is also carried by the part 20 and may be moved against the jaw 25 for moving the jaw toward the jaw 24. A handle 32 is mounted on the screw 31 and permits the operator to move the jaw 25 toward the jaw 24 for clamping the line 5 therebetween. The jaws may be removed when worn, or jaws of different sizes may be placed within the housing for clamping lines of different sizes.

Figure 2 shows an eye-link 33 pivoted at 34 to the triangular portion 11. Figure 1 shows a cable 35 passed through the eye-link and secured to a sill member of the derrick base 2. I further provide a cord 36 for supporting the "dead line" fastener when not in use. Figure 1 shows the cord secured to a portion of the derrick frame, although when the device is in use the cord 36 is detached from the frame.

The cable or line 5 is passed to a storage reel and the excess portion of the line is wrapped around the reel ready for future use.

Storage reel

The storage reel is shown in detail in Figures 7 and 8. A frame indicated generally at 37 carries a shaft 38 that rotatably supports the reel. A pin 39 locks the shaft against accidental removal.

The reel itself comprises a sleeve 40 removably mounted on the shaft and carrying discs 41 and 42. Spider arms 43 and 44 are secured to the discs 41 and 42 respectively and extend radially from the axis of the reel. In Figure 7 I show eight spider arms extending from each disc although this number may be varied. The spider arms 43 and 44 are arranged in pairs and connecting bars 45 are welded to the pairs as shown in Figure 8. A strip of metal 46 is formed into a cylinder and encloses the portions of the bars 45 disposed between the arms 43 and 44. The bars 45 project beyond the arms 43 and are formed into hook shaped ends 47. The excess line 5 is wrapped around the cylindrical portion 46 of the reel, and the convolutions of the line are held between the pairs of arms 43 and 44.

From the foregoing description of the various parts of the device, the operation thereof may be readily understood.

The "dead line" fastener and the storage reel are shown in proper position on the derrick base 2 in Figure 1. As already stated the line 5 extends from the drum 3 to the sheaves on the crown block and traveling block, and then the line is passed around the cylindrical flange 12 and is clamped against movement by the clamp 18. The disc 13 is temporarily removed while the line is wrapped around the cylinder flange 12. The disc is then placed back in position and is secured against removal by the nut 16. The excess portion of the line 5 is then wound on the storage reel ready for future use.

When the portion of the line 5 mounted on the drum 3 and the sheaves become worn, and it is desired to remove the worn portion and substitute another section of the line, the operator frees the line from the clamp 18 and from the flange 12 and feeds the line from the storage reel to the drum end of the line. It will be seen that the clamp 18 when freed from the line 5 will leave the line uninjured. Moreover, the clamp 18 can be quickly and easily released from the line in order to accommodate the moving of the line through to the drum end. After enough line has thus been moved, the worn line may be cut off and the fresh line spooled on to the drum 3. The "dead line" fastener and clamp again holds the line in the manner already described, and the unused portion of the line is wound upon the storage reel. The hooks 47 are for the purpose of receiving a manilla rope for rotating the storage reel. The reel may be turned by hand or by means of a crank.

It will be seen that I provide a device that will clamp a line at any desired point intermediate the ends of the line and this clamping of the line will constitute a "dead end" for the line. It will further be seen that I provide a storage means for the excess line which will hold the unused line in readiness for future use. The device is simple in construction and is durable and efficient for the purpose intended. When the device is used, it is possible to use the excess line on the storage reel down to the very last foot rather than throw the last thousand feet of line away which is usually the practice. As already stated the changing of the position of the line so that new portions will be subjected to wear, will give the line a far longer life.

While I have shown only the preferred form of my invention, it should be understood that various changes or modifications may be made within the scope of the appended claims without departing from the spirit of the invention.

I claim:

1. In combination, a backing member having a drum formed integral therewith, a disc removably disposed on the free end of the drum, a clamp housing, an arm extending into the housing and being secured to the member, line gripping members disposed in the housing, and means for causing the line gripping members to rigidly hold a line in the housing.

2. For use on a line having one of its end portions extended off to the work and its other end portion dead-ended, a fastener applicable to said line intermediately of said ends so as to lay the dead end portion in reserve, said fastener comprising a backing member, a snubbing member made integral with the backing member, a retaining member, means detachably connecting the retaining member solely to the free end of the snubbing member for the ready removal therefrom so as to permit the broadside application of at least one turn of the line to the snubbing member, clamping means to grip the line at some point contiguous to the dead end, and an openable and closable housing carrying the clamping means on a tangent to the periphery of the snubbing member and being carried by the backing member.

3. A dead end fastener for a line comprising a snubbing member to which at least one turn of the line is applicable at a place intermediately of the ends of the line, a backing member of which said snubbing member is a part, a pair of gripping members to receive the dead end of the line therebetween, supporting means loosely carrying one of the gripping members, an arm carried by the backing member and having said supporting means and the other gripping member commonly connected thereto, and means acting between the supporting means and said loose gripping member to adjust said loose gripping member.

4. For use on a line having one of its end portions extended off to the work and its other end portion dead-ended, a fastener applicable to said line intermediately of said ends so as to lay the dead end portion in reserve and to suspend the fastener in mid-air, said fastener including a backing member, anchoring means extended from said backing member to a solid foundation so that the pull on the active line will be transferred directly to the anchoring means, clamp means adapted to be moved wide open to admit the line without having to thread the dead end portion therethrough, said clamp consisting of a pair of gripping members to receive the dead end of the line therebetween, supporting means loosely carrying one of the gripping members, an arm carried by the backing member and having said supporting means and the other gripping member commonly connected thereto, and means acting between the supporting means and said loose gripping member to adjust said loose gripping member.

HENRY ALLYN WOOD.